United States Patent [19]

Vermillion

[11] Patent Number: 4,758,023
[45] Date of Patent: Jul. 19, 1988

[54] REMOVABLE CONNECTION ASSEMBLY
[75] Inventor: Don W. Vermillion, Anderson, S.C.
[73] Assignee: The Singer Company, Stamford, Conn.
[21] Appl. No.: 49,369
[22] Filed: May 14, 1987
[51] Int. Cl.⁴ ............................................. F16L 37/24
[52] U.S. Cl. ........................................ 285/7; 285/401; 285/423; 285/903; 285/908; 285/921
[58] Field of Search ................... 285/7, 401, 376, 260, 285/908, 903, 921

[56] References Cited
U.S. PATENT DOCUMENTS

| 196,104 | 10/1877 | Addison | 285/376 |
|---|---|---|---|
| 2,271,931 | 2/1942 | Williamson, Jr. et al. | 285/260 X |
| 2,660,457 | 11/1953 | Mallon | 285/7 |
| 3,897,090 | 7/1975 | Maroschak | 285/260 |
| 3,950,014 | 4/1976 | Doubleday | 285/7 |
| 4,082,327 | 4/1978 | Sting et al. | 285/903 X |
| 4,140,422 | 2/1979 | Crumpler, Jr. et al. | 285/401 X |

FOREIGN PATENT DOCUMENTS

| 148026 | 12/1936 | Austria | 285/7 |
|---|---|---|---|
| 2138207 | 3/1972 | Fed. Rep. of Germany | 285/7 |
| 594227 | 5/1959 | Italy | 285/260 |

Primary Examiner—Thomas F. Callaghan
Attorney, Agent, or Firm—David L. Davis

[57] ABSTRACT

A connection assembly is particularly useful for positively connecting a flexible hose member with an inlet plug for a suction source while being adapted for subsequent disconnection without requiring any specialized tools. In connecting operation, an integral extension portion of a flexible hose member is telescopically inserted into an inlet plug to a predetermined longitudinal stopping point therein, and then rotated so as to cause engagement of projections formed on the extension portion and projection-receiving holes formed in the inlet plug. Such engagement rotatably and longitudinally secures the flexible hose relative the inlet plug. Slots are formed in the inlet plug for guiding the hose member projections during longitidinal movement of the hose member. The hose member may be selectively withdrawn by reverse rotation of the hose extension portion and longitudinal removal thereof from the inlet plug. During such reverse rotational movement, a camming surface is used to assist withdrawal of projections from their respective holes for disengaging same without requiring special tools.

16 Claims, 1 Drawing Sheet

REMOVABLE CONNECTION ASSEMBLY

BACKGROUND OF THE INVENTION

This invention concerns the removable connection of two elements in general, and in particular the removable connection in fixed rotational and longitudinal relationship of two tubular elements.

The need to selectively connect and disconnect tubular members or hose-like members can arise in many environments. One common circumstance in which the general public is faced with such connection/disconnection problems is with modular, telescopically-related members comprising a collection of attachments for a vacuum device. For example, a typical canister-style vacuum cleaner may have two or more tube or hose sections and related attachments which the user may selectively configure for desired use, and which may be disconnected for storage. In such instance, it is desirable to provide interconnecting members which are reliably air-tight to prevent loss of vacuum power, but preferably without requiring specialized tools or training for either connection or disconnection of the members.

Another desirable aspect of modular attachments for vacuum systems, from the perspective of the user, is that individual damaged pieces may be replaced as needed without the expense of replacing the entire set of attachments. Heretofore, relatively longer hose pieces (often corrugated or the like for added strength) have been one of the more costly components of a set, and have required a significant member integrally formed therewith or permanently attached thereto for operatively engaging the hose with a piece of vacuum equipment.

Various tubular coupling arrangements related to suction cleaning devices are known in the prior art. Some of these are commonly referred to as detent-type connectors, by virtue of their having a resilientlybiased member selectively positioned for coupling and uncoupling. For example, Martinet (U.S. Pat. No. 2,582,446), Coss (U.S. Pat. No. 2,420,866), and White (U.S. Pat. No. 2,212,679), all disclose air-tight tubular couplings wherein one tubular member is received inside another and variously secured thereto by a resilientlybiased member. In each such patent, the outer tubular member is provided with some type of opening through its circumference, while the inner tubular member has an outwardly biased projection for engaging such opening to secure the tubular members together. The outward biasing for the projections may be selectively overcome by the user with various tools or direct actuation elements as disclosed by the references so as to permit disconnection of the two tubular elements.

Other types of connecting devices are also known. For example, Helm et al. (U.S. Pat. No. 3,212,795) disclose inwardly tapering grooves on the inside diameter of a receiving member for guiding coupling bosses formed on the outside of two-segment hinged coupling member which surrounds an end of a hose. The bosses are guided towards boss-engaging openings formed in the circumference of the receiving member, and located longitudinally beyond the end of the grooves and in line with the respective longitudinal axes thereof. Various tools may be used to force the bosses inward and thus out of engagement with the openings therefor, which permits withdrawal of the hose and its surrounding coupling member from the receiving member.

Symes et al. (U.S. Pat. No. 343,089) disclose two members adapted for telescopic coupling, with slots or openings defined in the outside member for receipt of lugs outwardly mounted on the inside member. Once such lugs are positioned in the slots, a collar about the outside member is rotated so that inwardly projecting lugs of such collar engage the lugs of the telescopically-received inside member for securing the coupling.

In still another known tubular coupling construction, Martinet (U.S. Pat. No. 2,245,151) provides a slot located partially about the circumference of a receiving member for retaining an outwardly biased boss of a received member. Such structure is intended to permit relative rotation of the coupled elements during use thereof. However, the amount of such rotation is limited by opposite circumferentially spaced ends of such circumferential slot which cause disengagement of the coupled tubes. As noted in Martinet's own later patent (U.S. Pat. No. 2,582,446; listed above), such twistable coupling of his '151 patent frequently becomes accidentally disconnected so that positive connection is thus not reliably assured at all times.

SUMMARY OF THE INVENTION

It is a general object of this invention to provide an improved coupling which recognizes and addresses drawbacks and inadequacies of the prior art. More particularly, it is an object of the present invention to provide a coupling assembly which permits selected and reliable connection of two members (such as tubular members) in relatively fixed rotational and longitudinal relationship, while yet permitting their subsequent controlled disconnection without requiring any specialized tools.

It is still another object of this invention to provide a removable connection assembly wherein tubular members or the like may be coupled together by successive longitudinal and rotational movements of the members themselves, without requiring direct actuation of any other coupling collars, lugs, or the like; and with subsequent decoupling being accomplished through successive reverse rotational movement and longitudinal separation of such two members.

This invention more particularly concerns, in one preferred embodiment thereof, an improved coupling mechanism for operative association with a vacuum producing device. In such instances, it is a more particular object to provide a coupling assembly which enables removable but reliable selected air-tight coupling of designated members in all operating conditions, and further while virtually eliminating the possibility of accidental or non-controlled disconnection thereof.

It is still another more general object of this invention to provide tubular-like members with features thereof which permit coupling of same upon their longitudinal and rotational engagement in predetermined positions, and which permits their subsequent decoupling without requiring special tools upon their reverse rotation and longitudinal withdrawal from one another. Hence, it is yet another present object to provide a coupling assembly for being positively but removably engaged by successive manipulations of the major elements thereof, without requiring direct manipulation or application of specialized tools to more specific members thereof.

Particularly when practiced in conjunction with modular attachment or extension pieces for use with a vacuum source, it is an object of this invention to permit flexible hose members or the like of such modular pieces attached to an inlet plug directly associated with such vacuum source to be interchanged without requiring concurrent interchange of the inlet plug, or even requiring disconnection of such inlet plug from the vacuum source.

Still another object of this invention is to provide particular decoupling means in a coupling assembly for selectively decoupling members without tools, which members otherwise are reliably joined in relatively fixed rotational and longitudinal relationship.

While various presently disclosed features may be combined so as to form given embodiments of the present invention, several particular preferred embodiments are set forth herein for exemplary purposes.

One such embodiment in accordance with the present invention concerns structure for the removable connection of two generally tubular members, comprising: first and second tubular members of relative diameters such that the first member may be longitudinally received within the second member; at least one slot formed longitudinally within the second member; at least one opening defined in the circumference of the second member, the opening being adjacent an end segment of the slot and located outside the longitudinal axis of the slot; at least one projection formed substantially radially outward on the outside of the first member, and adapted so as to be guided in the slot when the first member is longitudinally introduced into the second member, and so as to frictionally engage the opening when the first member is radially twisted relative the second member once the projection has longitudinally penetrated the second member adequate to reach the slot end segment; whereby the first and second members may be operatively coupled with one another substantially fixed against further relative longitudinal or rotational movement therebetween.

Yet another construction in accordance with the present invention concerns a connection assembly for removably coupling a flexible hose with a piece of equipment, such assembly comprising: a female coupling member comprising relatively rigid material, and having a receiving portion formed towards one end thereof, with the other end thereof being adapted for operative association with a piece of equipment; a male coupling member comprising relatively flexible material, and having a corrugated hose portion for reinforced flexure thereof and a generally cylindrical extension portion integral therewith, the extension portion having an outside diameter less than the inside diameter of the receiving portion of the female member to permit coupling receipt thereof within the female member; a pair of projections integrally defined on diametrically opposed sides of the outside diameter of the male member extension portion; a pair of longitudinal slots integrally defined in diametrically opposed sides of the inside diameter of the female member receiving portion, the slots having sidewalls defining respective open ends of the slots adapted for sliding receipt of the pair of projections, and further defining respective closed terminal ends of the slots for providing predetermined stops for longitudinal sliding movement of the projections respectively in the slots; and a pair of projection-receiving holes defined in diametrically opposed positions radially through the circumference of the female member, and formed circumferentially removed from and contiguous with the respective terminal ends of the slots; wherein the male member may be positively but removably secured within the female member by longitudinally inserting the male member therein with the integral projections thereof guided in the slots until the projections engage the slot terminal ends, and then relatively rotating the male and female members so that such projections are further guided into and engage the holes whereby the members are radially and axially locked together.

Still another example of a presently preferred embodiment in accordance with this invention includes an apparatus for removably connecting a flexible hose in relatively air-tight and substantially fixed rotational and longitudinal relationship with a tubular inlet plug for a suction source, such apparatus comprising: a relatively thick-walled rigid inlet plug adapted for direct but removable air-tight operative connection with a suction source, and having a receiving mouth directed substantially away from such suction source whenever said plug is connected with same; two diametrically opposed openings radially defined through the circumference of the inlet plug; two diametrically opposed shallow channels longitudinally formed within the inlet plug, each channel being defined by parallel sidewalls which are open adjacent the inlet plug mouth, and which sidewalls are closed at the other ends thereof terminating adjacent the openings and circumferentially displaced therefrom, with one of each respective pair of the sidewalls being contiguous with its respective opening and defining a passage through such one sidewall so as to permit an element to be guided longitudinally through the length of such channel and then transversely into its respective opening; a relatively thin-walled flexible hose having a generally accordion-like construction for reinforced flexibility and having a cylindrical extension portion integral therewith, the diameter of such cylindrical portion being adapted for telescopic receipt of same within the inlet plug mouth; a pair of diametrically opposed radially-outward projections formed on the flexible hose cylindrical extension portion, such projections being adapted for respective receipt within the inlet plug channels with the hose extension portion inwardly compressed, the projections thereby being forced outward, under biasing resulting from such compression, into relatively fixed rotational and longitudinal engagement with the openings whenever the projections are transversely guided into such openings from longitudinal receipt in their respective channels adjacent the closed ends thereof.

Without specific limitation as to the foregoing embodiments, additional features are disclosed herewith which may be variously combined to comprise a given embodiment of this invention. For example, particular camming means may be provided for causing projections on an inner tubular member to be disengaged from projection-receiving holes or recesses defined in an outer tubular member whenever such inner and outer members are rotated with respect to each other. Such disengagement frees the respective tubular members for longitudinal withdrawal, as further discussed herein.

The foregoing objects and features of this invention, together with additional objects, features, and aspects thereof, are more fully discussed in the remainder of this specification. Also, it is expected that those of ordinary skill in the art may practice the present invention with certain apparent modifications, variations, and equivalent substitutions and reversal of parts for various elements thereof. All such variations and equivalents are intended to come within the spirit and scope of this invention by virtue of present reference thereto.

BRIEF DESCRIPTION OF THE DRAWINGS

A presently preferred exemplary embodiment of the present invention, including the best mode thereof, may be better understood by studying the following detailed specification, in conjunction with the accompanying drawings, in which.

Figure 1:
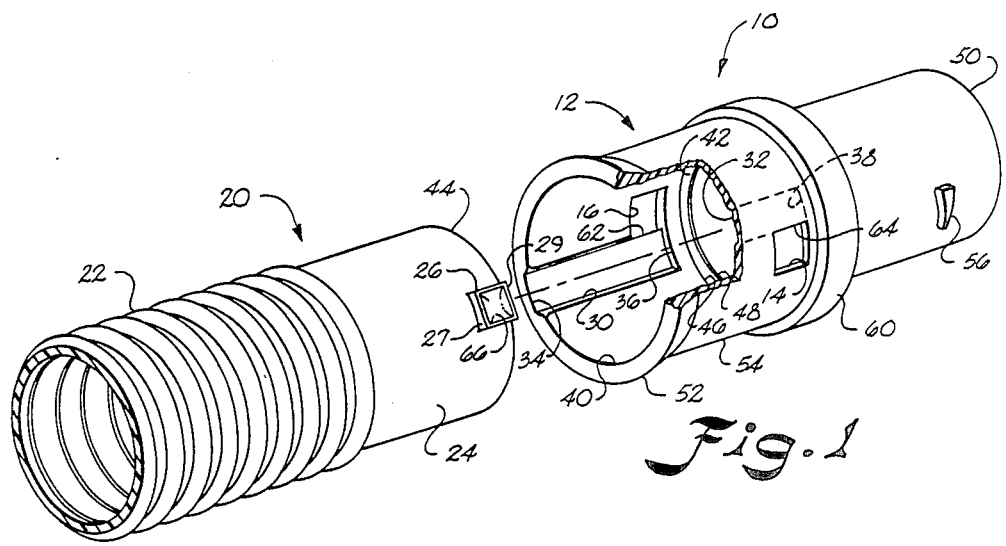
FIG. 1 is a perspective side view in partial cutaway illustrating two matable coupling elements in accordance with the present invention, such elements being coaxially aligned and fully decoupled from one another.

Repeat use of reference characters throughout the following specification and in the accompanying drawings is intended to represent same or analogous features or elements of this invention.

DETAILED DESCRIPTION OF THE PREFERRED EMBODIMENT

Figure 2:
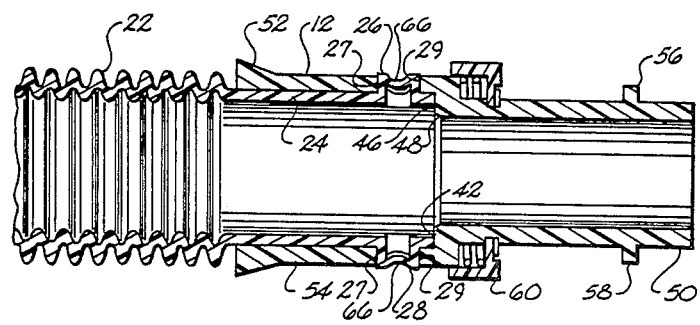
FIG. 2 illustrates a cross-sectional view along the longitudinal axes of two matable coupling elements as in FIG. 1, with such elements being fully coupled in fixed rotational and longitudinal relationship with one another.

In general, the present invention is preferably practiced with separate female and male coupling members, which are each substantially tubular in nature and have respective diameters such that the male coupling member may be telescopically received within the female with a relatively close fit thereto. FIGS. 1 and 2 illustrate examples of such coupling members decoupled and coupled, respectively Referring to such figures, a female coupling member 10 is co-axially aligned with a male coupling member 20, and is provided with a receiving portion 12 for receiving member 20. While various types of members may be coupled in accordance with broader aspects of the present invention, male coupling member 20 is in this embodiment (which is especially adapted for use with a vacuum cleaner or similar device) preferably comprised of a flexible hose having a substantially corrugated or accordion-like region 22 (truncated in FIGS. 1 and 2 for convenience in illustration), which corrugated hose section is integrally formed with a substantially cylindrical extension portion 24. The entire hose is comprised of relatively flexible and resilient material, particularly to the satisfaction of purposes more fully explained below.

As best illustrated in FIG. 2, extension portion 24 is adapted to telescopically fit within receiving portion 12 of female member 10, with diametrically opposed radially-outward projections 26 and 28 thereof respectively received in diametrically opposed openings 14 and 16 formed through the circumference (i.e., the circumferential wall) of the female member.

While the entire hose assembly is formed of relatively flexible material, corrugated portion 22 thereof provides reinforced flexure. Without such reinforcing corrugations, extension portion 24 may readily be compressed radially inward by introduction of its projections 26 and 28 respectively into relatively shallow guide channels 30 and 32 formed in the inside diameter of female member 10. The precise depth of such channels can vary in different embodiments, but about one-third to one-half the thickness of the female member sidewalls is preferred. Such compression of extension portion 24 provides outward biasing for projections 26 and 28 so as to push or snap same outward into their respective openings 14 and 16. Female member 10 is comprised of relatively thick annular construction and generally rigid material. Such construction forms a durable coupling member suitable for direct operative association (i.e. connection) with a piece of equipment, such as a canister-type vacuum cleaner, particularly as an inlet plug therefor. Also, the rigidity of member 10 aides in the desired compression of male extension portion 24.

Projections 26 and 28 preferably have relatively rigid sidewalls 27 (four for each projection) so that inward force on the ends 31 of the projections will be transmitted through to their bases secured to or integrally formed with extension portion 24 so as to cause extension portion 24 to be radially compressed inward. Before the projections can be guided into openings 14 and 16, they must first be introduced into their respective channels 30 and 32 at the open ends 34 thereof adjacent a circumferential mouth 40 of receiving portion 12, and then longitudinally moved towards terminal ends 38 and 36 of the respective channels until reaching same. Once reaching such points respectively, members 10 and 20 may be relatively rotated in such direction as needed to move the projections from their respective channels and into their respective openings.

An annular boss 42 is defined within female coupling member 10 for providing a predetermined longitudinal stop for the forward end 44 of male member 20. As best illustrated by FIG. 2, projections 26 and 28 are axially displaced a predetermined distance from forward end 44, which distance substantially corresponds to the distance respectively between terminal ends 36 and 38 of the channels and the axial placement of annular boss 42. Thus, the longitudinal travel of forward end 44 ends substantially coterminous with the longitudinal travel of the respective projections in their channels or slots 30 and 32.

Such structure renders the apparatus more user-friendly by providing improved handling and performance of coupling and uncoupling functions since the requisite positions for successive manipulations of the coupling members are better defined. In other words, engagement of forward end 44 with annular boss 42 cooperates with projections 26 and 28 reaching the terminal ends of their respective channels to provide a form of tactile feedback for a user inserting male coupling member 20 into female coupling member 10 so that such user will know whenever the members are properly positioned for subsequent relative rotation. Such feedback is further advantageous since coupling members typically comprise opaque materials which would make it literally impossible to otherwise visually ascertain that the projections were properly positioned for their subsequent rotation.

Figure 3:
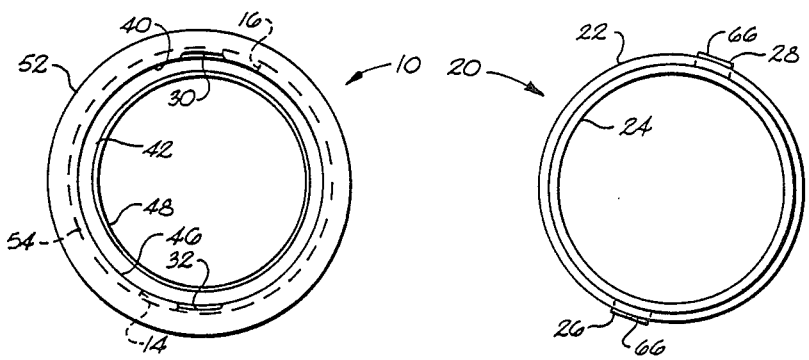
FIGS. 3 and 4 represent end views of female and male coupling members, respectively, of a matable pair of coupling members in accordance with this invention, such as in FIGS. 1 and 2.
Figure 4:
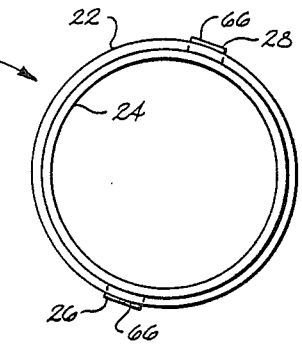

FIGS. 3 and 4 illustrate end views of female coupling member 10 and male coupling member 20, respectively. More particularly, FIG. 3 is a view looking into the receiving end portion of female member 10, which portion in practice will usually be directed away from a piece of equipment with which member 10 may be operatively associated, as understood by those of ordinary skill in the art. Channels 30 and 32 are illustrated as having generally parallel sidewalls, with slight outward angles thereto so as to provide needed drafting (also understood by those of ordinary skill in the art) whenever member 10 is formed by injection molding. Open end 34 of the channels may optionally be provided with slightly rounded sidewall edges 35 to facilitate introduction of the projections into the respective channels. Openings 14 and 16, which would not actually be visible in an end view of member 10, are shown in dotted line in FIG. 3 for purposes of further illustrating their relative circumferential positions, and in this embodiment their complete penetration to the outside diameter 54 of member 10.

Annular boss 42 has a smaller inside diameter than that of mouth 40, and includes a relatively flat annular region 46 (formed in a plane perpendicular to the longitudinal axis of member 10) and a smaller conical edge 48. Such conical edge 48 is angled inwards away from male member 20 so as to facilitate the flow of air and debris in such direction towards a suction source which preferably is operatively coupled with female member 10 at end 50 thereof.

As also illustrated in FIGS. 1 and 2, a radially enlarged area 52 is integrally formed with the body of receiving portion 12 for strengthening mouth 40 and improving the grip of such region for manipulation thereof. That is, since annular region 52 projects radially outward from the outside diameter 54 of member 12, a user can readily grasp the female coupling member near the mouth thereof without also partially grasping the corrugated hose portion 22 of the male member, which facilitates their separate manipulation.

Referring to FIG. 4, projections 26 and 28 are preferably integrally formed with (or alternatively rigidly attached to) cylindrical extension portion 24 of male member 20, which further has corrugated hose portion 22 formed integral therewith. As illustrated by FIGS. 2 and 4, corrugated portion 22 typically extends radially outward beyond cylindrical extension portion 24 (which is of a predetermined diameter adapted to be received within receiving portion 12), but does not extend axially outward to or beyond annular region 52. As further more particularly illustrated by FIG. 2, projections 26 and 28 preferably extend substantially through their respective openings 14 and 16 so as to lie generally flush with the outside diameter 54 of receiving portion 12.

While the details thereof form no particular feature of this invention, female coupling member 10 in this given embodiment may be further adapted for direct connection with a piece of equipment such as a vacuum producing device, i.e. vacuum cleaner. Lugs 56 and 58 integrally formed with the forward end 50 of member 10 permit coupling of such member with a suction source in a known fashion Likewise, spring-loaded collar 60 functions in a known manner during such direct coupling between member.10 and a suction source to ensure substantial and air-tight connection between the two. Of course, various types of coupling mechanisms other than lugs 56 and 58 and collar 60 may be practiced in given circumstances without departing from the spirit and scope of this invention.

In the illustrated embodiment, coupling member 10 may be commonly referred to as an inlet plug for a suction source, with a resulting advantage of this embodiment of the invention being that the hose portion or male member 20 may be interchanged without the necessity of also interchanging the inlet plug, or even removing the inlet plug. As a practical result, a user is able to replace a damaged or worn hose portion without the expense of replacing the substantial inlet plug therefor Furthermore, since the inlet plug is itself selectively connectable with the suction source, the coupling between members 10 and 20 need not be decoupled on a frequent basis to permit disassembly of the modular attachments in order to use same with a suction source. Instead, actual decoupling of members 10 and 20 may need be practiced perhaps only several times during the life of the equipment, eg. whenever it is time to replace one or the other of the hose portion or the inlet plug. Accordingly, the outward biasing of projections 26 and 28 achieved with the resiliency of the flexible cylindrical portion 24 itself is adequate for reliable removable connection in instances where such resiliency might otherwise with frequent use ultimately become too worn for ideal performance (even though practical performance could continue).

Preferred use of the disclosed exemplary structure illustrated by coupling members 10 and 20 (so that same may selectively be rotatably and longitudinally fixed with relation to each other) is as follows.

Initially, when starting with decoupled members, cylindrical portion 24 is inserted into receiving portion 12, with projections 26 and 28 aligned and guided in their respective channels 30 and 32. Since there is a relatively close fit between portions 24 and 12, the cylindrical extension portion is necessarily radially inwardly compressed (as discussed above) so that the projections may be received in their respective channels or slots. Once so positioned, cylindrical portion 24 (together with its projection or projections) is longitudinally moved deeper into receiving portion 12 until forward sidewalls 29 of the respective projections engage the terminal ends 36 and 38 of their respective channels. As discussed above, at approximately the same time of such engagement, forward end 44 of male member 20 engages annular boss or stop 42 within female member 10.

Once such full bore longitudinal movement of members 20 and 10 is accomplished, they are then suitably rotated relative one another so that projections 26 and 28 move transversely to the longitudinal axis of their respective channels so as to be guided into their respective openings 14 and 16. The radially outward biasing on such projections causes them to assume their fully seated positions within openings 14 and 16 as illustrated in present FIG. 2. One side of each of the respective parallel sidewalls of each channel define passageways 62 and 64 which facilitate right-angle movement of the projections from their respective channels into the openings associated therewith Once so engaged with a relatively close fit between the projections and their respective openings, members 10 and 20 are coupled with one another in relatively fixed rotatable and longitudinal relationship.

However, as a further feature of the present invention, such relatively fixed relationship between the coupling members may be decoupled in accordance with this invention without the use of any specialized tools. For such decoupling of members joined as illustrated in present FIG. 2, the surfaces defining passages 62 and 64 provide camming surfaces or camming means for forcing projections 26 and 28 radially inward (which in turn radially compresses cylindrical portion 24) during selected rotation which is directly reverse to that used in initially coupling members 10 and 20. In other words, a side (i.e. transverse) sidewall of each respective projection is cammed against surfaces defining passages 62 and 64 whenever male member 20 is rotated in a selected direction to force such projection sidewall against the camming surfaces Once the projections are disengaged from their respective openings by such radial withdrawal therefrom, the projections re-enter their respective channels to permit subsequent longitudinal withdrawal of male member 20 from female member 10, during which longitudinal withdrawal the projections continue to be guided in their respective channels as was the case during their original insertion. Accordingly, the present invention provides coupling structure which permits selected coupling and decoupling of two members in air-tight relationship and in fixed rotational and longitudinal relationship, without requiring any specialized tools or skills for either the coupling or subsequent decoupling procedure.

While a specific exemplary embodiment has been illustrated and discussed for present disclosure purposes, it is to be understood that various modifications and variations may be made thereto without departing from the spirit and scope of the present invention. For example, the shape of the projections and their respective openings need not be limited to the rectangular shape illustrated, but instead may be other shapes such as circular, oval or the like.

Also, an embodiment in accordance with the present invention need not have two projections and respective channels, but instead may have a configuration of a single projection and respective channel and opening therefor, or alternatively may have more than two sets of projections/channels/openings for a given embodiment. Likewise, the relative placement of such sets of elements need not be diametrically opposed to each other as specifically illustrated, but other positions about the circumference of respective coupling members may be practiced as desired for particular embodiments of this invention.

Furthermore, there is no requirement that the openings in the circumference of female member 10 be formed entirely therethrough so as to expose ends 31 of the projections. Such openings could instead be recesses adequate to engage the respective projections sufficient to prevent rotational or longitudinal movement thereof until desired by the user, and then by relying on the same camming structure discussed above. Also, the particular rigidity of ends 31 is not as important as that of the sidewalls 27 of the projections, and such ends could in fact even be omitted so that the projections comprise a hollow-core construction.

Also, as readily understood by those of ordinary skill in the art, while male member 20 may comprise an integral element formed by blow molding or the like, the corrugated portion 22 thereof need not be as readily compressible in a radial sense as the cylindrical portion 24 thereof. Thus, corrugations in portion 22 may vary according to choice in different embodiments so as to impart the desired flexibility and ruggedness to the hose portion. Moreover, male member 20 need not have any corrugations at all, but instead may comprise a cylindrical member, or a member with enlarged annular construction, all of which does not affect the more fundamental coupling features presently disclosed herein.

While particular terms and language have been used in describing the presently preferred exemplary embodiment, it is to be understood that all such words are words of description and example only, and not words of limitation, which appear only in the appended claims.

What is claimed is:

1. Structure for the removable connection of two generally tubular members, comprising:
   first and second tubular members of relative diameters such that said first member may be longitudinally received within said second member, said first and second members comprising relatively flexible and rigid material, respectively;
   at least one slot formed longitudinally within said second member;
   at least one opening defined through the circumferential wall of said second member, said opening being adjacent an end segment of said slot, circumferentially displaced from the longitudinal axis of said slot, and defining a projection camming surface contiguous with said slot;
   at least one projection formed substantially radially outward on the outside of said first member, and adapted so as to be guided in said slot when said first member is longitudinally introduced into said second member, with said first member being radially compressed during such introduction so as to provide radially outward biasing for said projection to snap same outward into said opening so as to frictionally engage said opening when said first member is circumferentially twisted relative said second member once said projection has longitudinally penetrated said second member adequate to reach said slot end segment;
   wherein reversed twisting of said first member for moving said projection towards said slot forces said projection against said projection camming surface which radially depresses said projection and said first member so as to frictionally disengage said projection from said opening such that said projection will reenter said slot to be withdrawn therealong for decoupling said first and second tubular members.

2. Structure as in claim 1, wherein:
said tubular members are substantially cylindrical; and
said first tubular member is received within said second member with a relatively close fit thereto.

3. Structure as in claim 2, wherein:
said second tubular member has a relatively thick annular construction; and
said slot comprises a relatively shallow channel defined by parallel sidewalls in the inside diameter of said second tubular member, which sidewalls form a passage adjacent said opening to facilitate introduction of said projection into said opening from said channel.

4. Structure as in claim 1, further comprising:
an additional respective slot and opening formed in said second member diametrically opposed to said at least one slot and respective opening thereof; and
an additional projection disposed on said first member diametrically opposed to said at least one projection thereof, wherein said projections respectively cooperate with said slots and their respective openings for coupling the two tubular members.

5. Structure as in claim 1, wherein:
said second tubular member comprises an inlet plug adapted to be operatively and fixedly connected to a suction source; and said first tubular member comprises a relatively flexible, corrugated hose with an integral cylindrical extension portion, said at least one projection being integrally formed with such cylindrical projection; whereby said flexible hose may be removably secured to said inlet plug for operative association with such suction source, and selectively interchanged without requiring removal of said inlet plug from the suction source.

6. Structure as in claim 1, wherein said opening is multi-sided, with one side thereof contiguous with said slot defining said projection camming surface.

7. Structure as in claim 6, wherein the thickness of said one side of said opening defining said camming surface is less than the thickness of the other sides defining said opening.

8. Structure as in claim 1, further comprising:
an annular boss formed within said second member, and defining a predetermined stop for longitudinal introduction of said first member into said second member substantially coterminous with said projection reaching said slot end segment; and
wherein said projection when engaged with said opening extends radially outward substantially therethrough so as to meet generally flush with the outside diameter of said second member.

9. A connection assembly for removably coupling a flexible hose with a piece of equipment, said assembly comprising:
a female coupling member comprising relatively rigid material, and having a receiving portion formed towards one end thereof, with the other end thereof being adapted for operative association with a piece of equipment;
a male coupling member comprising relatively flexible material, and having a corrugated hose portion for reinforced flexure thereof and a generally cylindrical extension portion integral therewith, said extension portion having an outside diameter less than the inside diameter of said receiving portion of said female member to permit coupling receipt thereof within said female member;
a pair of projection integrally defined on diametrically opposed sides of the outside diameter of said male member extension portion;
a pair of longitudinal slots integrally defined in diametrically opposed sides of the inside diameter of said female member receiving portion, said slots having sidewalls defining respective open ends of said slots adapted for sliding receipt of said pair of projections, and further defining respective closed terminal ends of said slots for providing predetermined stops for longitudinal sliding movement of said projections respectively in said slots; and
a pair of projection-receiving holes defined in diametrically opposed positions radially through the circumferential wall of said female member, and formed circumferentially displaced from and contiguous with the respective terminal ends of said slots; wherein
said male member may be positively but removably secured within said female member by longitudinally inserting said male member therein with said integral projections thereof guided in said slots until said projections engage said slot terminal ends, and then relatively rotating said male and female members so that said projections are further guided into and engage said holes whereby said members are radially and axially locked together;
said projections have substantially rigid sidewalls so that said flexible male member is radially compressed inward whenever said projections are guided in said slots, thereby providing outward biasing on said projections so as to snap same outward upon engagement thereof with said projection-receiving holes; and further wherein
sidewalls for each of said slots define respective openings therein contiguous with a respective sidewall in part defining each of said adjacent holes, such structure facilitating initial passage of said projections from said slots into said holes and forming camming means for disengaging said projections and said holes upon selected rotation of said male member relative said female member, whereby said projections are forced against said respective sidewalls defining said holes so that said male coupling member radially compressed inward to permit said projections to exit said holes and re-enter their respective slots, which facilitates subsequent longitudinal separation of said female and male members.

10. An assembly as in claim 9, further comprising:
an annular boss defined within said female coupling member and intermediate said receiving portion and said other end thereof; and wherein
said projections are formed at a predetermined distance from the end of said extension portion adapted to be introduced into said receiving portion, so that such end engages said female member annular boss approximately as said projections slidingly reach said slot terminal ends.

11. An assembly as in claim 9, wherein:
said projections and said projection-receiving holes are substantially rectangular-shaped and of relative size so as to form a substantially close fit therebetween for enhancing radial and axial locking of said female and male coupling members; and
said slot sidewalls are slightly rounded where defining said slot open ends so as to facilitate introduction of said projections therein.

12. Apparatus for removably connecting a flexible hose in relatively air-tight and substantially fixed rotational and longitudinal relationship with a tubular inlet plug for a suction source, said apparatus comprising:
a relatively thick-walled rigid inlet plug adapted for direct but removable air-tight operative connection with a suction source, and having receiving mouth directed substantially away from such suction source whenever said plug is connected with same;
two diametrically opposed openings radially defined through the circumferential wall of said inlet plug;
two diametrically opposed shallow channels longitudinally formed within said inlet plug, each channel being defined by parallel sidewalls which are open adjacent said inlet plug mouth, and which sidewalls are closed at other ends thereof terminating adjacent said openings and circumferentially displaced therefrom, with one of each respective pair of said sidewalls being contiguous with its respective opening and defining a passage through such one sidewall so as to permit an element to be guided longitudinally through the length of such channel and then transversely into its respective opening;
a relatively thin-walled flexible hose having a generally accordion-like construction for reinforced flexibility and having a cylindrical extension portion integral therewith, the diameter of such cylindrical portion being adapted for telescopic receipt of same within said inlet plug mouth; and a pair of diametrically opposed radially-outward projections formed on said flexible hose cylindrical extension portion, said projections being adapted for respective receipt within inlet plug channels with said hose extension portion inwardly compressed, said projections thereby being forced outward, under biasing resulting from such compression, into relatively fixed rotational and longitudinal engagement with said openings whenever said projections are transversely guided into said openings from longitudinal receipt in their respective channels adjacent the closed ends thereof; wherein said one sidewall for each channel defining said passage thereof each comprise respective camming surfaces for facilitating removal of projections from their respective inlet plug openings, wherein selected transverse movement of said projections relative the longitudinal axis of its respective channel causes engagement of such projection with its respective camming surface, which results in said hose extension portion being inwardly compressed to permit each projection to be transversely guided through its respective passage into its respective channel, for subsequent longitudinal withdrawal of said flexible hose cylindrical extension portion from said inlet plug.

13. An apparatus as in claim 12, wherein:

said projections and said openings have substantially the same predetermined shape with a close fit therebetween for substantially fixed engagement of said flexible hose with said inlet plug, and said projections extend radially outward adequate so as to be generally flush with the outside diameter of said inlet plug in the annular region of said openings.

14. An apparatus as in claim 13, wherein said predetermined shape is rectangular, and said channel sidewalls are substantially parallel to each other and spaced adequately so as to guide opposing parallel walls of said rectangular shaped projections with relatively close fit therebetween, said projections thereby requiring a substantially right-angle movement thereof a the closed channel ends for transverse movement into their respective openings.

15. An apparatus as in claim 12, wherein said camming surfaces comprise projection disengagement means for forcing said projections radially inward upon selected transverse movement of said projections from their respective openings towards their respective channels, whereby said projections may re-enter such channels.

16. An apparatus as in claim 15, wherein each of said camming surfaces includes a lip of each of said passages as formed by the bottom of its respective channel, said lip providing camming action to a sidewall of its respective projection during transverse movement thereof, whereby said projections may be essentially retracted from projecting into their respective openings without requiring specialized tools therefor.

* * * * *